US009830709B2

(12) United States Patent
Li et al.

(10) Patent No.: US 9,830,709 B2
(45) Date of Patent: Nov. 28, 2017

(54) VIDEO ANALYSIS WITH CONVOLUTIONAL ATTENTION RECURRENT NEURAL NETWORKS

(71) Applicant: QUALCOMM Incorporated, San Diego, CA (US)

(72) Inventors: Zhenyang Li, Amsterdam (NL); Efstratios Gavves, Amsterdam (NL); Mihir Jain, Amsterdam (NL); Cornelis Gerardus Maria Snoek, Volendam (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/249,280

(22) Filed: Aug. 26, 2016

(65) Prior Publication Data

US 2017/0262995 A1 Sep. 14, 2017

Related U.S. Application Data

(60) Provisional application No. 62/307,366, filed on Mar. 11, 2016.

(51) Int. Cl.
*G06K 9/62* (2006.01)
*G06T 7/00* (2017.01)
*G06N 3/04* (2006.01)
*G06N 3/08* (2006.01)

(52) U.S. Cl.
CPC ......... *G06T 7/0081* (2013.01); *G06N 3/0445* (2013.01); *G06N 3/08* (2013.01); *G06T 2207/10004* (2013.01); *G06T 2207/20084* (2013.01)

(58) Field of Classification Search
None
See application file for complete search history.

(56) References Cited

U.S. PATENT DOCUMENTS

2017/0124432 A1\* 5/2017 Chen .................. G06F 17/2785

OTHER PUBLICATIONS

Ballas N., et al., "Delving Deeper into Convolutional Networks for Learning Video Representations," Mar. 1, 2016 (Mar. 1, 2016), XP055368494, Retrieved from the Internet: URL:https://arxiv.org/pdf/1511.86432.pdf, 11 pages, [retrieved on May 2, 2017].
International Search Report and Written Opinion—PCT/US2017/017188—ISA/EPO—May 12, 2017.

(Continued)

*Primary Examiner* — Atiba O Fitzpatrick
(74) *Attorney, Agent, or Firm* — Seyfarth Shaw LLP

(57) ABSTRACT

A method of processing data within a convolutional attention recurrent neural network (RNN) includes generating a current multi-dimensional attention map. The current multi-dimensional attention map indicates areas of interest in a first frame from a sequence of spatio-temporal data. The method further includes receiving a multi-dimensional feature map. The method also includes convolving the current multi-dimensional attention map and the multi-dimensional feature map to obtain a multi-dimensional hidden state and a next multi-dimensional attention map. The method identifies a class of interest in the first frame based on the multi-dimensional hidden state and training data.

30 Claims, 10 Drawing Sheets

(56) References Cited

OTHER PUBLICATIONS

Li Z., et al., "VideoLSTM Convolves, Attends and Flows for Action Recognition," arxiv.org, Cornell University Library, 201 OLIN Library Cornell University Ithaca, NY 14853, Jul. 6, 2016 (Jul. 6, 2016), XP080712545, 17 pages.

Sharma S., et al., "Action Recognition Using Visual Attention," Feb. 14, 2016 (Feb. 14, 2016), XP055367387, Retrieved from the Internet: URL:https://arxiv.org/pdf/1511.04119.pdf [retrieved on Apr. 25, 2017] Sections 1, 3.1 and 3.2, 11 pages.

Shi X., et al., "Convolutional LSTM Network: A Machine Learning Approach for Precipitation Nowcasting," Sep. 19, 2015 (Sep. 19, 2015), XP055368436, Retrieved from the Internet: URL:https://arxiv.org/pdf/1506.04214.pdf, 12 pages, [retrieved on May 2, 2017].

Srivastava N., et al., "Unsupervised Learning of Video Representations using LSTMs," Jan. 4, 2016 (Jan. 4, 2016), XP055368326, Retrieved from the Internet: URL:https://arxiv.org/pdf/1502.04681.pdf, 12 pages, [retrieved on Apr. 28, 2017].

Donahue J., et al., "Long-term Recurrent Convolutional Networks for Visual Recognition and Description," 2015, pp. 2625-2634.

Kalchbrenner N., et al., "A Convolutional Neural Network for Modelling Sentences," arXiv:1404.2188v1 [cs.CL] Apr. 8, 2014, 11 pages.

Pinheiro P.H.O., et al., "Recurrent Convolutional Neural Networks for Scene Parsing," arXiv:1306.2795v1 [cs.CV] Jun. 12, 2013, IDIAP Research Report, Jun. 2013, 16 pages.

Strigl D., et al., "Performance and Scalability of GPU-based Convolutional Neural Networks," 18th Euromicro conference on Parallel, Distributed and Network-based Processing, Feb. 2010, Retrieved from the internet URL: https://www.researchgate.net/publication/221392298, Retrieved dated on Apr. 15, 2016, pp. 317-324.

Xu K., et al., "Show, Attend and Tell: Neural Image Caption Generation with Visual Attention," arXiv:1502.03044v2 [cs.LG] Feb. 11, 2015, 22 pages.

\* cited by examiner

VIDEO ANALYSIS WITH CONVOLUTIONAL ATTENTION RECURRENT NEURAL NETWORKS

CROSS-REFERENCE TO RELATED APPLICATION

The present application claims the benefit of U.S. Provisional Patent Application No. 62/307,366, filed on Mar. 11, 2016, and titled "VIDEO ANALYSIS WITH CONVOLUTIONAL ATTENTION RECURRENT NEURAL NETWORKS," the disclosure of which is expressly incorporated by reference herein in its entirety.

BACKGROUND

Field

Certain aspects of the present disclosure generally relate to machine learning and, more particularly, to improving systems and methods of considering the spatial relationship of an input when processing a multi-dimension hidden state and a multi-dimension attention map.

Background

An artificial neural network, such as an artificial neural network with an interconnected group of artificial neurons (e.g., neuron models), may be a computational device or may be a method to be performed by a computational device.

A convolutional neural network (CNN) refers to a type of feed-forward artificial neural network. Convolutional neural networks may include collections of neurons, each neuron having a receptive field and also collectively tiling an input space. Convolutional neural networks may be used for pattern recognition and/or input classification.

Recurrent neural networks (RNNs) refer to a class of neural network, which includes a cyclical connection between nodes or units of the network. The cyclical connection creates an internal state that may serve as a memory that enables recurrent neural networks to model dynamical systems. That is, cyclical connections offer recurrent neural networks the ability to encode memory. Thus, if successfully trained, recurrent neural networks may be specified for sequence learning applications.

A recurrent neural network may be used to implement a long short-term memory (LSTM). For example, the long short-term memory may be implemented in a microcircuit including multiple units to store values in memory using gating functions and multipliers. A long short-term memory may hold a value in memory for an arbitrary length of time. As such, long short-term memory may be useful for learning, classification systems (e.g., handwriting and speech recognition systems), and/or other applications.

In conventional systems, a recurrent network, such as a recurrent neural network, is used to model sequential data. Recurrent neural networks may handle vanishing gradients. Thus, recurrent neural networks may improve the modeling of data sequences. Consequently, recurrent neural networks may improve the modelling of the temporal structure of sequential data, such as videos.

Still, in conventional recurrent neural networks (e.g., standard RNNs), input dimensions are treated equally, as all dimensions equally contribute to the internal state of the recurrent neural network unit. For sequential temporal data, such as videos, some dimensions are more important than others. An important area may refer to an area with action, an object, or an event. Moreover, at different times, different dimensions may be more important than other dimensions. For example, in a video with action, the locations with the action may be specified to have a greater weight and an increased contribution to the internal state of the recurrent neural network in comparison to locations without action. Therefore, conventional systems have proposed an attention recurrent neural network model that predicts an attention saliency vector for the input that weighs different dimensions according to their importance. Although an attention recurrent neural network weighs different dimensions according to their importance, there is also a need to consider the spatial dimensions of sequential data.

SUMMARY

In one aspect of the present disclosure, a method of processing data within a convolutional attention recurrent neural network is disclosed. The method includes generating a current multi-dimensional attention map. The current multi-dimensional attention map indicates areas of interest in a first frame from a sequence of spatio-temporal data. The method further includes receiving a multi-dimensional feature map. The method also includes convolving the current multi-dimensional attention map and the multi-dimensional feature map to obtain a multi-dimensional hidden state and a next multi-dimensional attention map. The method still further includes identifying a class of interest in the first frame based on the multi-dimensional hidden state and training data.

Another aspect of the present disclosure is directed to an apparatus including means for generating a current multi-dimensional attention map. The current multi-dimensional attention map indicates areas of interest in a first frame from a sequence of spatio-temporal data. The apparatus also includes means for receiving a multi-dimensional feature map. The apparatus further includes means for convolving the current multi-dimensional attention map and the multi-dimensional feature map to obtain a multi-dimensional hidden state and a next multi-dimensional attention map. The apparatus still further includes means for identifying a class of interest in the first frame based on the multi-dimensional hidden state and training data.

In another aspect of the present disclosure, a non-transitory computer-readable medium with non-transitory program code recorded thereon is disclosed. The program code for processing data within a convolutional attention recurrent neural network is executed by a processor and includes program code to generate a current multi-dimensional attention map. The current multi-dimensional attention map indicates areas of interest in a first frame from a sequence of spatio-temporal data. The program code also includes program code to receive a multi-dimensional feature map. The program code further includes program code to convolve the current multi-dimensional attention map and the multi-dimensional feature map to obtain a multi-dimensional hidden state and a next multi-dimensional attention map. The program code still further includes program code to identify a class of interest in the first frame based on the multi-dimensional hidden state and training data.

Another aspect of the present disclosure is directed to an apparatus for processing data within a convolutional attention recurrent neural network, the apparatus having a memory unit and one or more processors coupled to the memory unit. The processor(s) is configured to generate a current multi-dimensional attention map. The current multi-dimensional attention map indicates areas of interest in a first frame from a sequence of spatio-temporal data. The processor(s) is also configured to receive a multi-dimensional feature map. The processor(s) is further configured to convolve the current multi-dimensional attention map and the multi-dimensional feature map to obtain a multi-dimensional hidden state and a next multi-dimensional attention map. The processor(s) is further configured to identify a class of interest in the first frame based on the multi-dimensional hidden state and training data.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
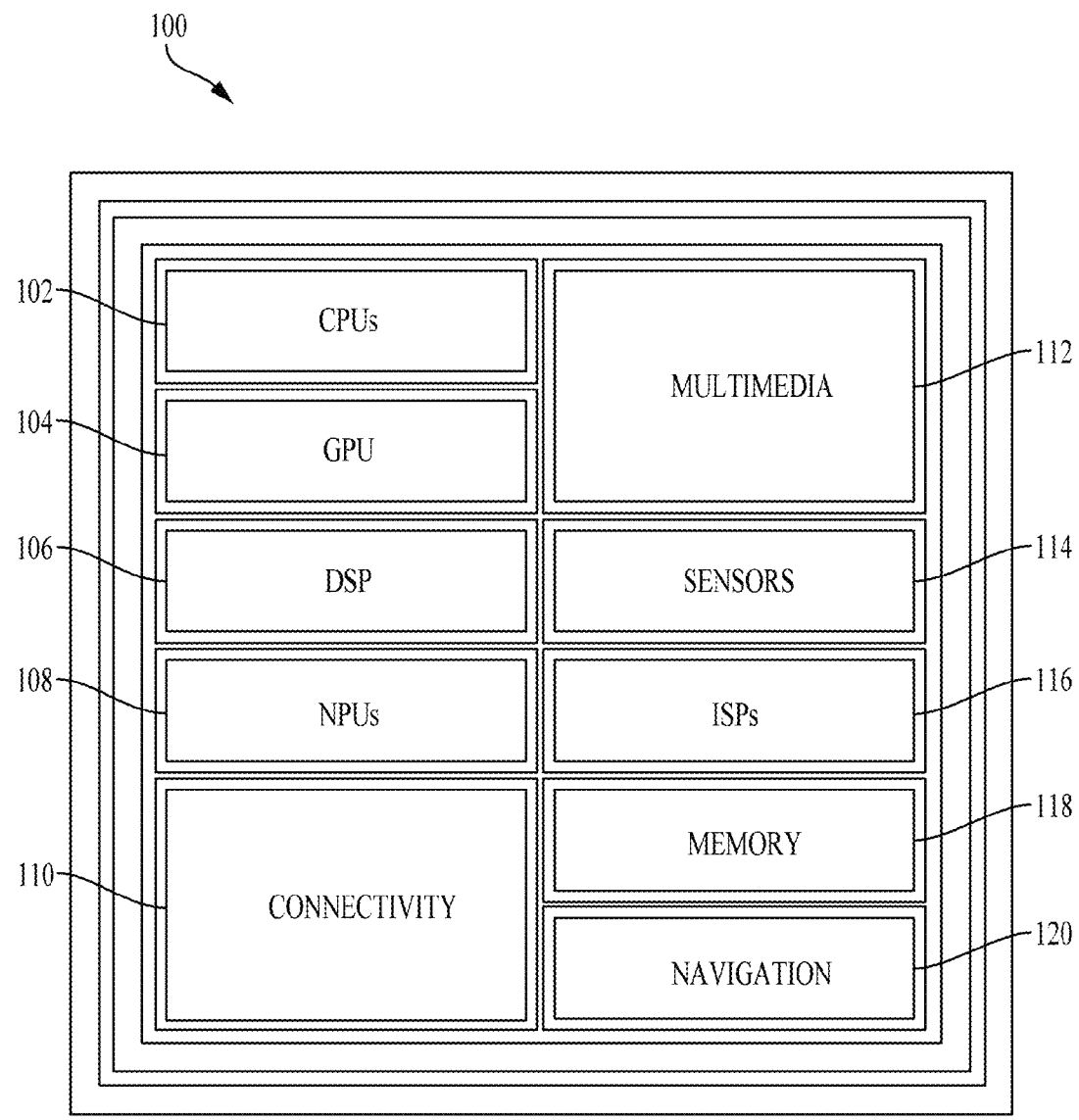
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Motion information has traditionally been an important ingredient in automated video understanding, both for traditional video encodings using dense trajectories or more recent two-stream deep convolutional neural network architectures. Unlike convolutional neural networks intended for images, recurrent neural networks were originally proposed to model sequential data. A variant of a recurrent neural network is the long short-term memory (LSTM) architecture. The long short-term memory network can handle vanishing gradients. Therefore, in comparison to conventional techniques, the recurrent neural network may improve the modeling of sequences of temporal data. Consequently, recurrent neural networks may improve the modelling for sequential temporal structure of videos to determine the location of an action, an object, and/or an event in the video.

As previously discussed, conventional recurrent neural networks treat all locations of a frame equally and do not discriminate between the various spatial locations in the frame. Still, to improve the classification of an object, an event, or an action of spatio-temporal data, the recurrent neural network should consider that certain regions are more pertinent than other regions of a frame. Some conventional approaches have proposed an attention recurrent neural network for action classification. The attention recurrent neural network assigns a greater importance (e.g., attention) to particular frame locations with actions, events, and/or objects of interest. The attention may be implemented with a saliency map (e.g., a map of conspicuous regions), which provides the recurrent neural network with an area of focus for a frame.

Conventional attention recurrent neural network use the recurrent neural network state at frame x to generate the attention for frame x+1, such that the attention recurrent neural network may predict the location of the action in the next frame. However, conventional attention recurrent neural networks rely on appearance only and ignore the motion patterns of sequential spatio-temporal data, such as videos. In most cases, a frame (e.g., image) from sequential spatio-temporal data, such as a video, has spatial dimensions. That is, there is a spatial correlation between pixels of the frame.

Thus, aspects of the present disclosure are directed to a convolutional recurrent neural network specified to learn spatio-temporal dynamics of sequential spatio-temporal data. That is, the convolutional attention recurrent neural network of the present disclosure may accommodate characteristics of the multi-dimensional structure of a video frame. Specifically, the convolutional attention recurrent neural network may treat the spatial dimensions of its input differently by varying the weights corresponding to different spatial dimensions. Specifically, aspects of the present disclosure are directed to an attention recurrent neural network, such as a convolutional attention recurrent neural network, which uses the spatial characteristics of an input for analytics.

FIG. 1 illustrates an example implementation of the aforementioned video analysis using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation 120, which may include a global positioning system.

The SOC 100 may be based on an ARM instruction set. In an aspect of the present disclosure, the instructions loaded into the general-purpose processor 102 may comprise code to generate a current multi-dimensional attention map. The instructions loaded into the general-purpose processor 102 may also comprise code to receive a multi-dimensional feature map. The instructions loaded into the general-purpose processor 102 may further comprise code to convolve the current multi-dimensional attention map and the multi-dimensional feature map to obtain a multi-dimensional hidden state and a next multi-dimensional attention map. The instructions loaded into the general-purpose processor 102 may further comprise code to identify a class of interest in the first frame based on the multi-dimensional hidden state and training data.

Figure 2:
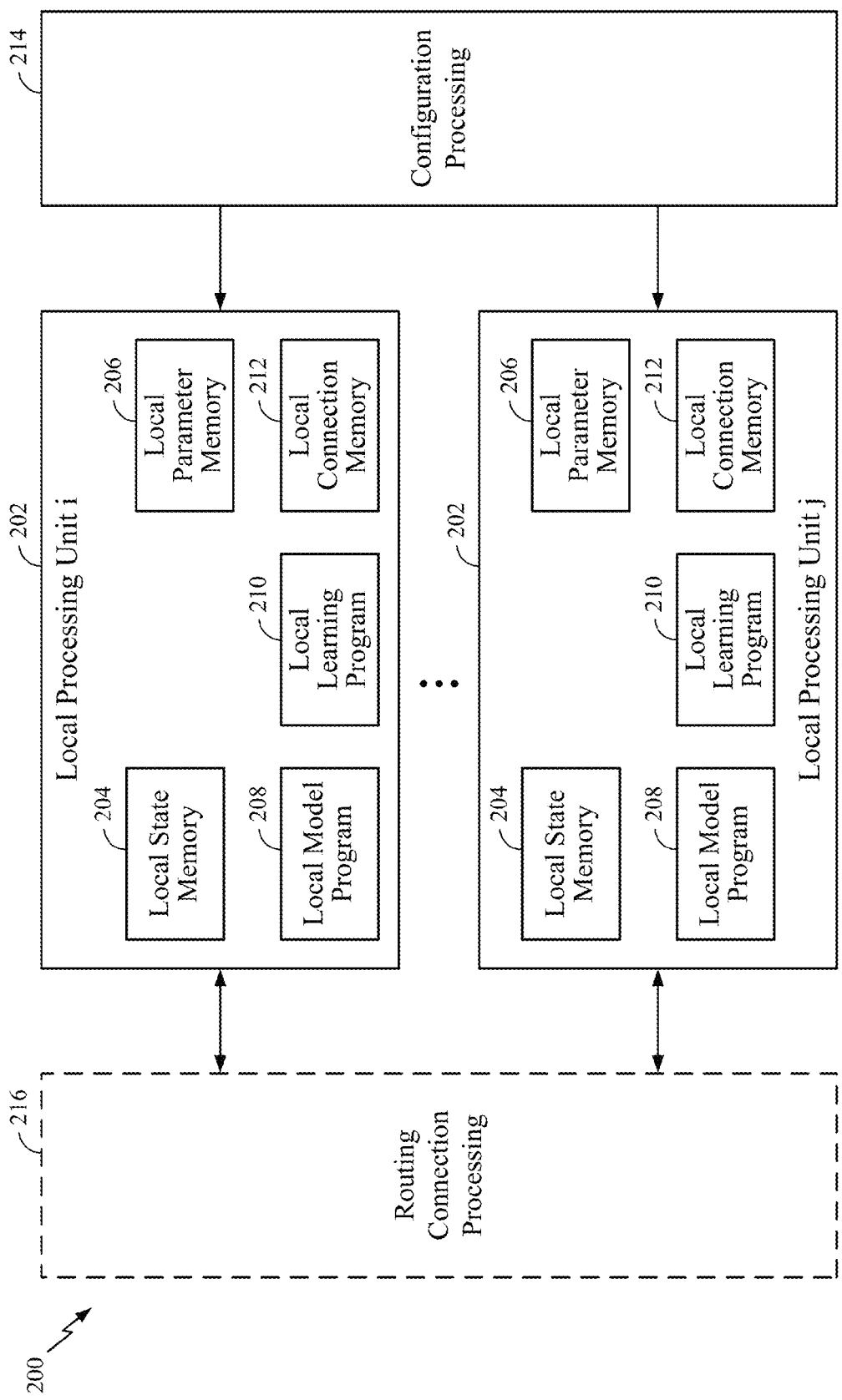
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

In one configuration, a processing model is configured for generating a current multi-dimensional attention map; receiving a multi-dimensional feature map; convolving the current multi-dimensional attention map and the multi-dimensional feature map to obtain a multi-dimensional hidden state and a next multi-dimensional attention map; and identifying a class of interest in the first frame based on the multi-dimensional hidden state and training data. The model includes generating means, receiving means, convolving means, and/or identifying means. In one configuration, the generating means, receiving means, convolving means, and/or identifying means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
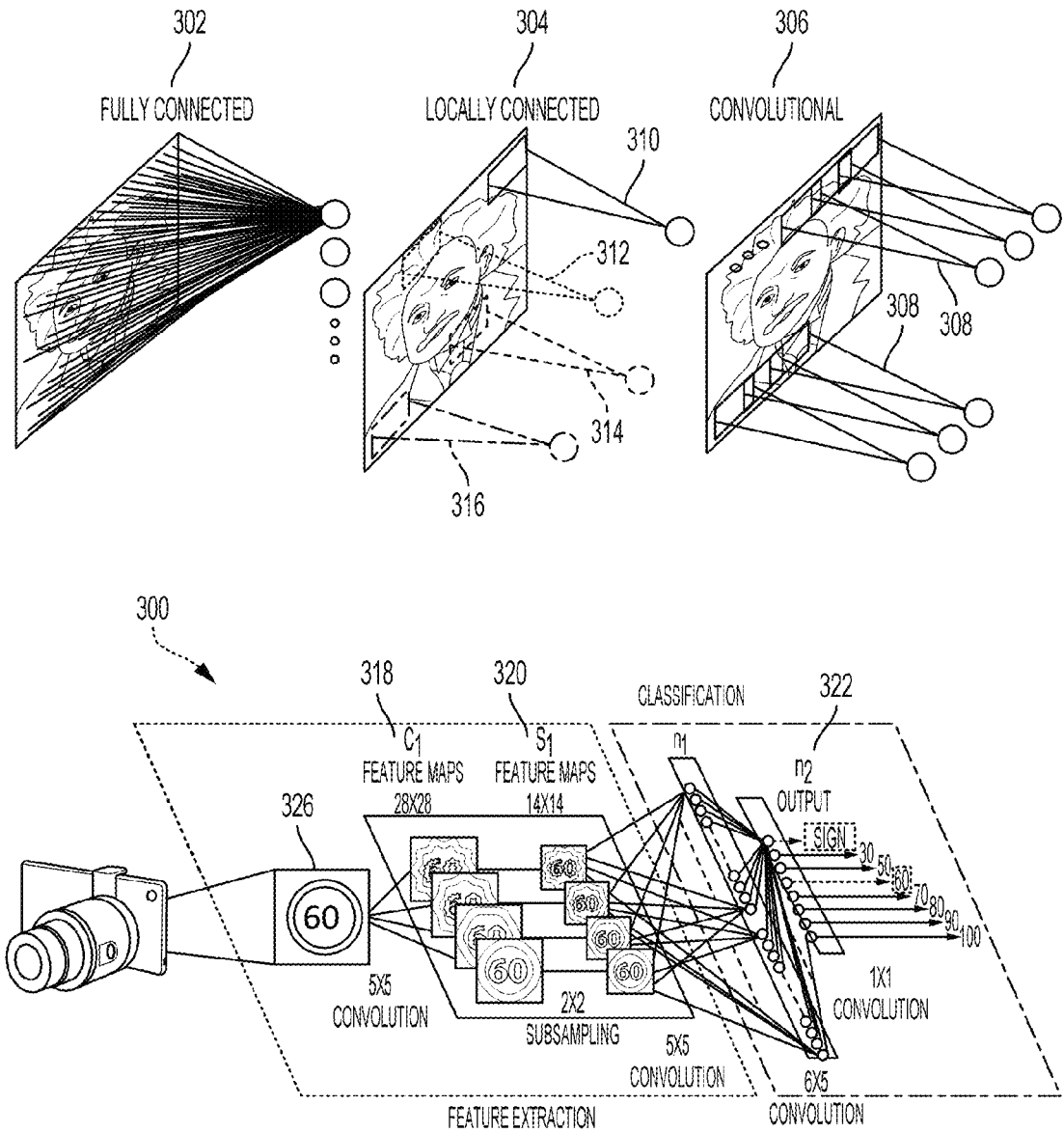
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 3B:
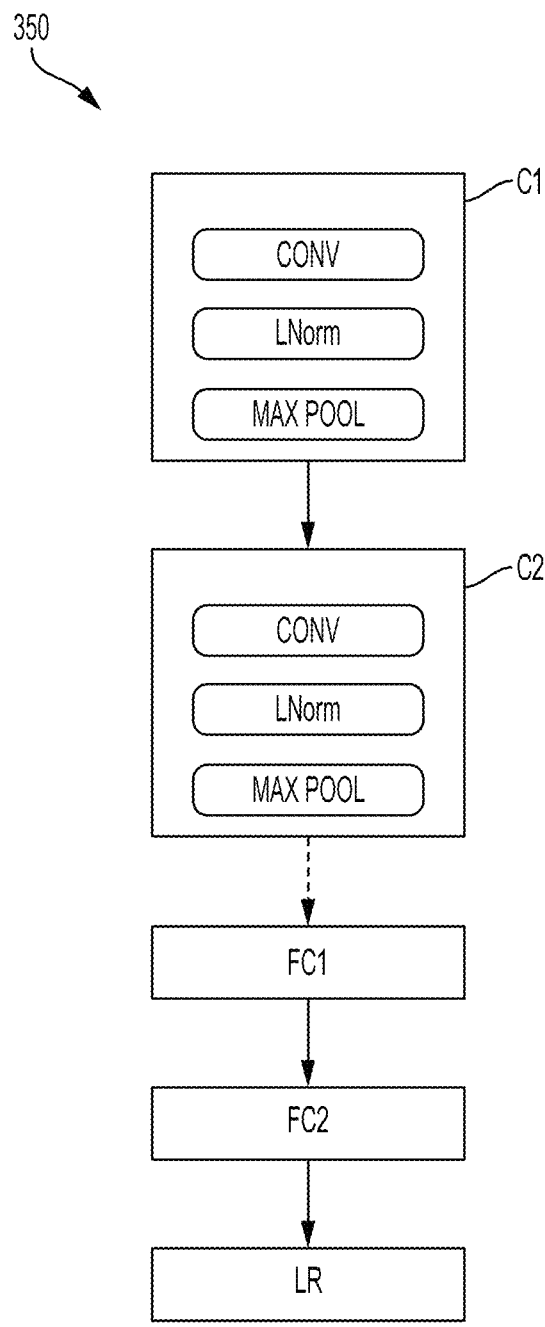
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
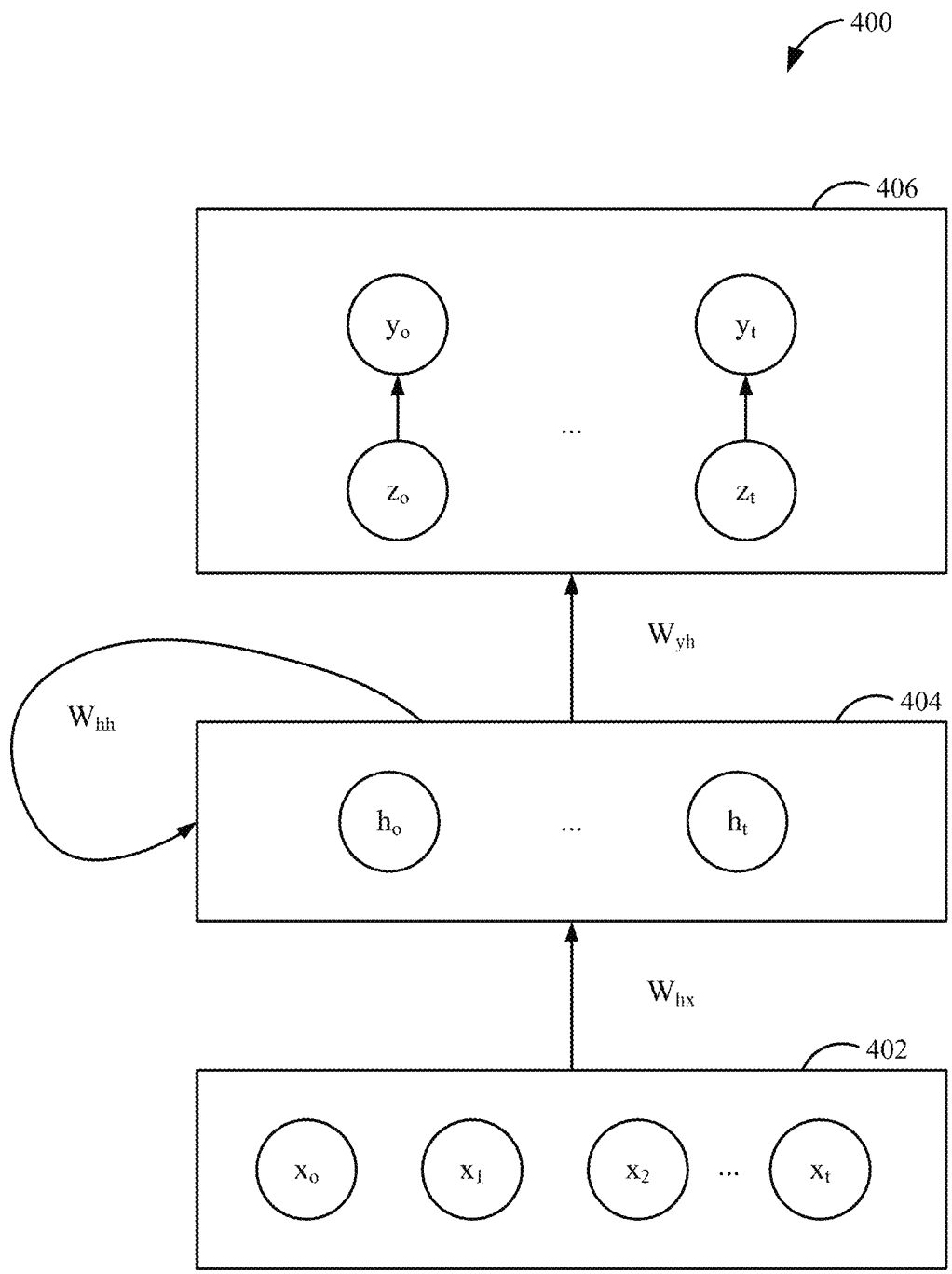
FIG. 4 is a schematic diagram illustrating a recurrent neural network (RNN) in accordance with aspects of the present disclosure.

FIG. 4 is a schematic diagram illustrating a recurrent neural network (RNN) 400. The recurrent neural network 400 includes an input layer 402, a hidden layer 404 with recurrent connections, and an output layer 406. Given an input sequence X with multiple input vectors $x_T$ (e.g., $X=\{x_0, x_1, x_2 \ldots x_T\}$), the recurrent neural network 400 will predict a classification label $y_t$ for each output vector $z_T$ of an output sequence Z (e.g., $Z=\{z_0 \ldots z_T\}$). For FIG. 4, $x_t \in \mathbb{R}^N$, $y_t \in \mathbb{R}^C$, and $z_t \in \mathbb{R}^C$ As shown in FIG. 4, a hidden layer 404 with M units (e.g., $h_o \ldots h_t$) is specified between the input layer 402 and the output layer 406. The M units of the hidden layer 404 store information on the previous values (t<t) of the input sequence X. The M units may be computational nodes (e.g., neurons). In one configuration, the recurrent neural network 400 receives an input $x_T$ and generates a classification label $y_t$ of the output $z_T$ by iterating the equations:

$$s_t = W_{hx}x_t + W_{hh}h_{t-1} + b_h \quad (1)$$

$$h_t = f(s_t) \quad (2)$$

$$o_t = W_{yh}h_t + b_y \quad (3)$$

$$y_t = g(o_t) \quad (4)$$

where $W_{hx}$, $W_{hh}$, and $W_{yh}$ are the weight matrices, $b_h$ and $b_y$ are the biases, $s_t \in \mathbb{R}^M$ and $o_t \in \mathbb{R}^C$ are inputs to the hidden layer 404 and the output layer 406, respectively, and $f$ and $g$ are nonlinear functions. The function $f$ may comprise a rectifier linear unit (RELU) and, in some aspects, the function g may comprise a linear function or a softmax function. In addition, the hidden layer nodes are initialized to a fixed bias bi such that at t=0 $h_o$=bi. In some aspects, bi may be set to zero (e.g., bi=0). The objective function, C(θ), for a recurrent neural network with a single training pair (x,y) is defined as $C(\theta) = \Sigma_t L_t(z, y(\theta))$, where θ represents the set of parameters (weights and biases) in the recurrent neural network. For regression problems, $L_t = \|(z_t - y_t)^2\|$ and for multi-class classification problems, $L_t = -\Sigma_j z_{tj} \log(y_{tj})$.

Figure 5B:
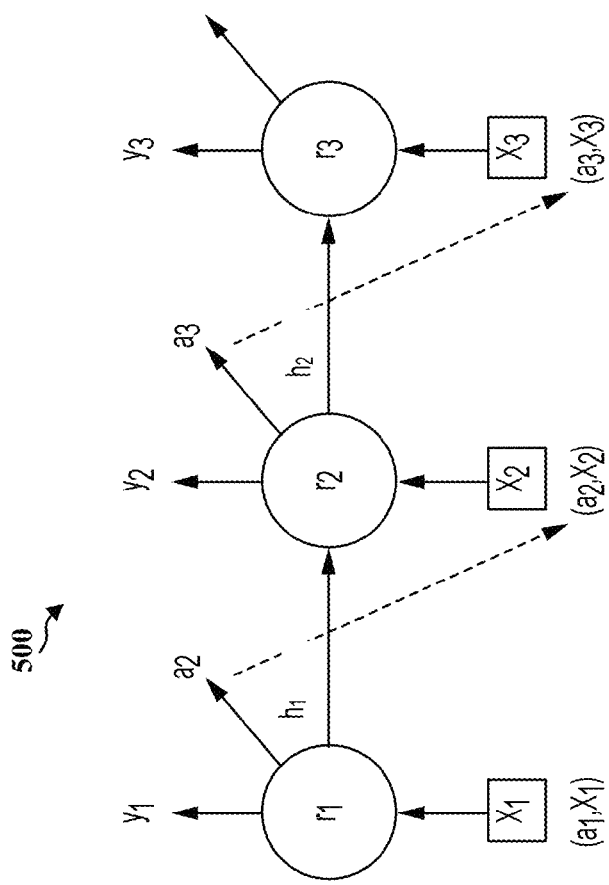
FIG. 5B is a diagram illustrating an exemplary architecture of an attention recurrent neural network (RNN) network for predicting an action in a video frame in accordance with aspects of the present disclosure.
Figure 5A:
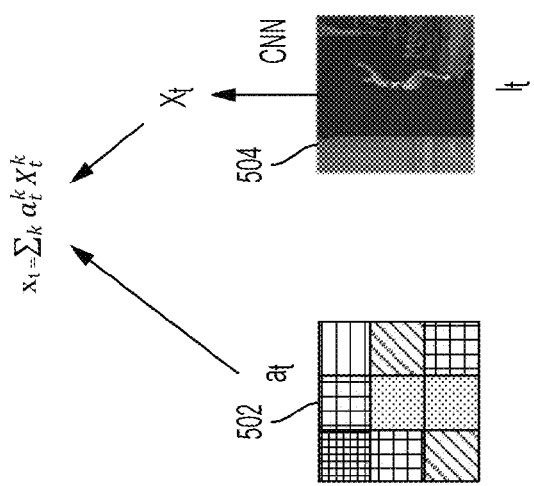
FIG. 5A is a diagram illustrating an image in a video frame for which a label is to be predicted in accordance with aspects of the present disclosure.

FIG. 5A is a diagram illustrating a frame (e.g., image) from a sequence of frames (e.g., a video) for which a classification label is to be predicted. Referring to FIG. 5A, the frame ($I_t$) 504 is provided as an input. An attention map ($a_t$) 502 corresponding to the frame 504 may be predicted, for example by a multi-layer perceptron using the previous hidden state ($h_{t-1}$) and the current feature map ($X_t$) as input. The attention map 502 may be combined with a feature map ($X_t$) generated from the frame 504. The feature map may be generated from an upper convolution layer of a convolutional neural network (e.g., FC2 in FIG. 3B) or via a recurrent neural network, for example. The feature map may be a two-dimensional (2D) or three-dimensional (3D) feature map, for appearance, optical flow, motion boundaries (e.g., gradient of optical flow), semantic segmentation at a feature level, and/or the like.

The attention map 502 provides a recurrent neural network, or a long short-term memory network, with the location of action in a frame 504. The action may be determined by using appearance motion information. As shown in FIG. 5A, an attention map $a_t$ and a feature map $X_t$ may be combined by a weighted sum over all the spatial locations in the frame to compute a weighted feature map $x_t$ (e.g., $x_t = \Sigma_k a_t^k X_t^k$) as an input, where $X_t^k$ indicates a feature vector (slice) in the feature map $X_t$ at each location k, and $a_t^k$ is the weight in the attention map at its location.

FIG. 5B illustrates an example of an architecture 500 of an attention recurrent neural network for predicting an action in a frame. The exemplary architecture 500 may comprise a recurrent neural network, such as a long short-term memory (e.g., an attention long short-term memory (LSTM) network). The exemplary architecture 500 may include an input layer with input units (e.g., $x_1$, $x_2$, $x_3$, . . . ), a hidden layer having hidden units (e.g., $r_1$, $r_2$, $r_3$, . . . ) and an output layer with output units (e.g., $y_1$, $y_2$, $y_3$, . . . ) and attention maps (e.g., a1, a2, a3, . . . ). Each of the units may, for example, comprise artificial neurons or neural units. As shown in FIG. 5B, for a first frame, an attention map $a_1$ and a feature map $X_1$ are supplied and used to compute a first input $x_1$ to a first hidden layer $r_1$ of the attention recurrent neural network. In some aspects, the feature map of the first frame may comprise appearance (e.g., visual information form the content of the frame).

The first hidden unit $r_1$ predicts a first classification label $y_1$ and outputs a first hidden state $h_1$ that is used to generate second attention map $a_2$ (e.g., subsequent attention map) for a second frame. The classification label may be referred to as a label, a class of interest, or an action label. Furthermore, the classification label indicates an action, an object, an event in the frame and/or the sequence of frames. The first hidden unit $r_1$ also outputs the first hidden state $h_1$ to a second hidden unit $r_2$. The hidden state at a time step is an internal representation of the neural network at that time step.

The second attention map $a_2$ and the feature map $X_2$ may be used to determine a second input $x_2$, which is input to the second hidden unit $r_2$ (that generates a second hidden state $h_2$). The hidden state of the second hidden unit $r_2$ is then used to predict a third attention map $a_3$ and a second classification label $y_2$ (e.g., the action) for the second frame.

The feature map $X_3$ and attention map $a_3$ may be used to determine input $x_3$, which is supplied to the third hidden unit $r_3$. The hidden state of the third hidden unit $r_3$ is used to predict the next attention map and an action label $y_3$ (e.g., the action of frame 3) for a third frame. This process may then be repeated for each subsequent frame at each succeeding time step.

Figure 6:
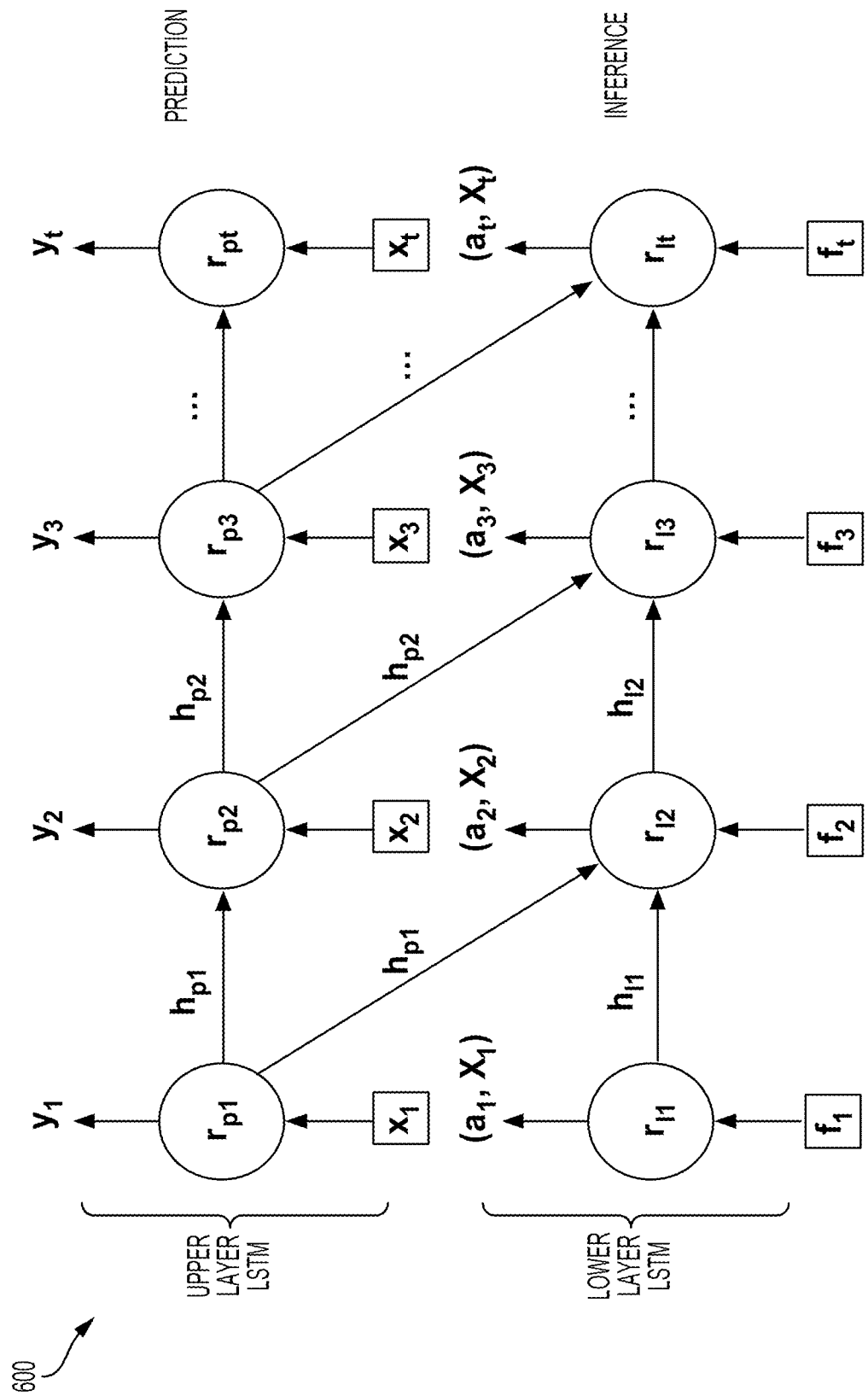
FIG. 6 is a diagram illustrating an exemplary architecture for predicting action in a video frame in accordance with aspects of the present disclosure.

FIG. 6 is a diagram illustrating an exemplary architecture 600 for predicting action in a frame and/or a sequence of frames, in accordance with aspects of the present disclosure. The exemplary architecture 600 may be configured as a stratified network including upper layer recurrent neural networks and lower layer recurrent neural networks (e.g., two layers of recurrent neural networks). Although the exemplary architecture includes recurrent neural networks, this is exemplary, as other neural network architectures are also considered. For example, the upper layer may be a recurrent neural network and the lower layer may be an upper convolution layer of a convolutional neural network. For example, the upper layer or lower layer may comprise a recurrent neural network and the upper layer or lower layer may comprise multiple stacked recurrent neural network or long short-term memory layers.

The lower layer recurrent neural network uses the motion information $f_t$ and the hidden states from the previous frame to generate an attention saliency map for the current frame t. The motion information $f_t$ may be produced from optical flow, which may be estimated using the current frame and the next frame. The motion information $f_t$ may be produced via an upper convolution layer of a CNN. For example, the lower layer recurrent neural network unit $r_{f2}$ may use the hidden state of the previous hidden unit $r_{f1}$ the hidden state $h_{p1}$ of the upper layer recurrent neural network unit $r_{p1}$ along with motion information $f_2$ to generate the attention map $a_2$ for a second frame. As such, the lower layer recurrent neural network may provide the upper layer recurrent neural network with attention maps. The layer units may be artificial neurons or neural units.

The generated attention map $a_t$ for a current frame may be combined with a representation of the current frame of a sequence of frames (e.g., video stream). The frame representation may be a frame feature map $X_t$ to create the input $x_t$ for the upper layer recurrent neural networks. In turn, the upper layer recurrent neural network may be configured to output a classification label $y_t$ for the current frame t. In addition, the upper layer recurrent neural network $r_{pt}$ may output a hidden state $h_t$ of the upper layer recurrent neural network unit, which may be supplied to a subsequent hidden units $r_{ft}$ of the lower layer recurrent neural network and used to calculate or infer the attention map for the subsequent frame $a_{t+1}$.

In operation, as shown in FIG. 6, for a first frame (time step $t_1$), an attention map $a_1$ may be predicted using a first lower hidden unit $r_{f1}$, which receives the motion information $f_t$ as input. The motion information may be produced from an optical flow, which may be computed using the first frame and the second frame. In one configuration, the optical flow is computed using two adjacent frames. The attention map $a_1$ is applied to the frame feature map $X_1$ to calculate an input $x_1$ comprising combined features. The combined features of the first input $x_1$ are output to the first upper hidden layer $r_{p1}$, which may predict a first classification label $y_1$. For example, the first classification label may label the frame as containing a diver, as shown in the frame 504 of FIG. 5A.

In addition, the first upper layer unit $r_{p1}$ outputs its hidden state $h_{p1}$ as an input to the subsequent lower hidden unit $r_{f2}$ at a next frame. In this example, the second lower hidden unit $r_{f2}$ receives a lower unit hidden state $h_{f1}$ from the first lower hidden unit $r_{f1}$. The hidden state of the first upper hidden unit $r_{p1}$ is also provided to the second upper hidden unit $r_{p2}$ of the upper layer LSTM. The hidden unit $r_{f2}$ also receives an motion input $f_2$ produced from optical flow. The optical flow input may be a field of vectors that predict how pixels at frame (e.g., frame t) will move to pixels at a next frame (e.g., frame t+1). For example, if the optical flow vector is a 2D vector expressed as 2,3 at x,y, the optical flow indicates that the pixels of frame t will move 2 pixels right and 3 pixels up in the subsequent frame t+1. That is, the optical flow tracks action in the pixels and considers motion to predict the most salient features within the video.

Using the optical flow and the hidden states (e.g., $h_{p1}$ and $h_{f1}$) from previous hidden units $r_{p1}$ and $r_{f1}$ a new attention map $a_2$ may be inferred via the hidden layer unit $r_{f2}$. The second attention map $a_2$ may be used with the frame appearance feature map of the second frame to calculate a second input $x_2$ to the second upper hidden unit $r_{p2}$. The second attention map $a_2$, which may include motion information (e.g., optical flow), may improve the identification of the regions of interest in the frame (e.g., actors) in comparison to previous frames. Thus, the second attention map may improve the label prediction.

The second upper hidden unit $r_{p2}$ may then predict a new hidden state $h_{p2}$ that infers a second classification label $y_2$. The hidden state of the second upper hidden unit $r_{p2}$ may be output to the third lower hidden unit $r_{f3}$ and may be used along with the hidden state of the second lower hidden unit $r_{f2}$ as well as the motion input (e.g., optical flow) $f_3$ to compute a third attention map $a_3$ for a third frame. The third attention map $a_3$ may be used along with the feature representation of the third frame (e.g., third frame appearance map $X_3$) to compute a third input $x_3$ for the third upper hidden unit $r_{p3}$, which in turn predicts a new hidden state that infers a classification label for the third frame. Thereafter, the process may be repeated.

Aspects of the present disclosure are not limited to the number of exemplary hidden units of a neural network shown in FIGS. 5B and 6. Of course, more or less hidden units of a neural network are also contemplated.

The attention map instructs a recurrent neural network of the location in a frame that an action takes place using appearance motion information, such as optical flow. In some aspects, the optical flow may be described via a field of vectors that indicate how a pixel will move from one frame to the next. The optical flow tracks action in the video pixels and considers motion to predict salient features (e.g., important spatial locations) within the video.

Sequential Data Analysis with Convolutional Attention Recurrent Neural Networks

As previously discussed, aspects of the present disclosure are directed to a convolutional attention recurrent neural network that uses spatial characteristics of sequential data. The sequential data may be referred to as a sequence of spatio-temporal data or a video. Although described generally with respect to recurrent neural networks, the present disclosure can employ a particular type of recurrent neural network, such as a long short-term memory (LSTM) network.

Conventional recurrent neural networks assume a one-dimensional input vector. Thus, the input-to-state and state-to-state operations within the recurrent neural network are implemented as inner products. Aspects of the present disclosure omit the gate formulations of a recurrent neural network, such as an LSTM network, to simplify the equation. In one configuration, the recurrent connection is defined as:

$$h_t = \sigma\left(M \cdot \begin{bmatrix} h_{t-1} \\ x_t \end{bmatrix}\right) \quad (5)$$

In EQUATION 5, $x_t$ is the one-dimensional input vector and M is the parameter matrix used to compute the inner product with $h_{t-1}$ and $x_t$. $\sigma(\ )$ is the activation function, $h_{t-1}$ is the hidden state from the previous time step, and $h_t$ is the hidden state at the current time step.

Figure 7A:
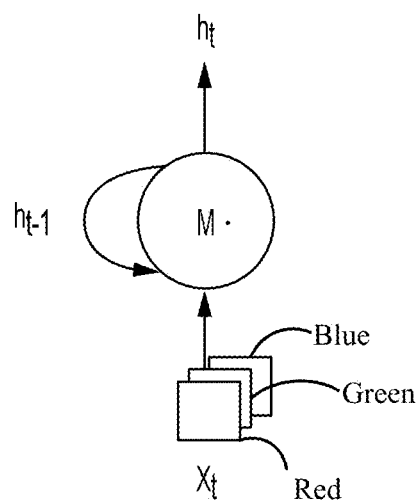
FIGS. 7A and 7B illustrate examples of conventional networks for processing data.

FIG. 7A illustrates an example of a conventional recurrent neural network. As shown in FIG. 7A, an input vector $x_t$ and the previous hidden state $h_{t-1}$ are multiplied by the parameter matrix M to compute the current hidden state $h_t$. As shown in FIG. 7A, the input vector $x_t$ may be a three-dimensional vector represented by red, blue, and green pixels (e.g., channels). The hidden state refers to an internal representation of the model.

Furthermore, conventional recurrent neural networks may be extended to emphasize particular input dimensions of a two-dimensional input by considering a saliency vector $a_t$:

$$h_t = \sigma\left(M \cdot \begin{bmatrix} h_{t-1} \\ a_t^T X t \end{bmatrix}\right) \quad (6)$$

Figure 7B:
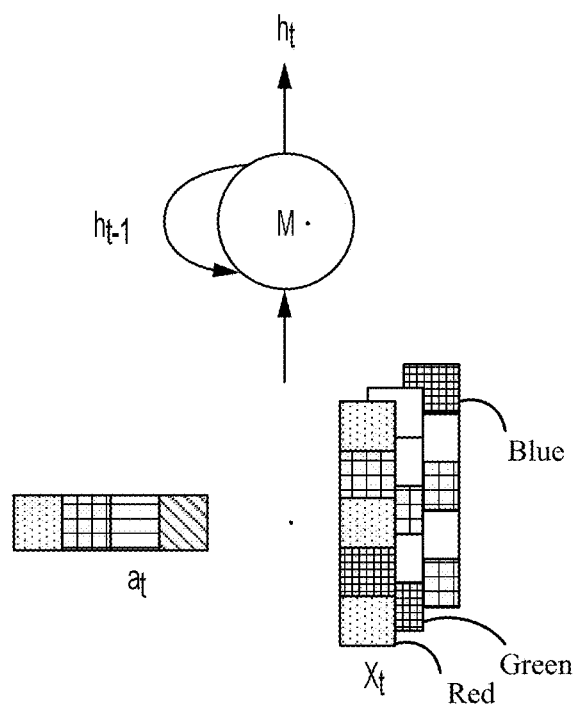

In EQUATION 6, the saliency vector $a_t$ is applied by a dot product on the input matrix $X_t$. The input matrix $X_t$ is composed of row vectors indicating features for different words in a sentence or different locations in an image. As shown in FIG. 7B, in one example, the input matrix $X_t$ is a three-dimensional matrix composed of red, blue, and green row vectors (e.g., channels). The saliency vector $a_t$ may be applied to an input matrix $X_t$ to emphasize particular dimensions of the input matrix $X_t$. For example, the input may be a sentence and specific words of the sentence may be emphasized as a result of applying the saliency vector $a_t$. In another example, the input may be an image and specific locations of the image may be emphasized as a result of applying the saliency vector $a_t$. In EQUATION 6, $a_t^T$ is the transpose of vector $a_t$.

FIG. 7B illustrates an example of an attention recurrent neural network. As shown in FIG. 7B, an input matrix $X_t$ and a saliency vector $a_t$ are combined with the previous hidden state $h_{t-1}$ as an input to the network. In one configuration, the network uses the parameter matrix M to compute the current hidden state $h_t$.

For images and/or other types of inputs with two or more dimensions, vectorizing the input into a matrix does not consider the spatial relationship (e.g., correlation) between the elements of the input, such as pixels. That is, the conventional attention recurrent neural network does not consider the spatial structure that characterizes the input $X_t$.

Aspects of the present disclosure are directed to a neural network that replaces the inner products with convolutions to return three-dimensional output with spatial structure. The convolutional operation may preserve the spatial nature of an input, such as the spatial correlation of pixels in an image.

In one configuration, the three-dimensional inputs are further refined by two-dimensional spatial attention saliency matrices that emphasize specific (e.g., important) spatial locations in the input:

$$H_t = \sigma\left(F * \begin{bmatrix} H_{t-1} \\ A_t \odot X_t \end{bmatrix}\right) \quad (7)$$

In EQUATION 7, F is a multi-dimensional filter, such as a multi-dimensional convolutional filter, that processes an input, such as $I_t$ of FIG. 5A, having a spatial structure. The convolutional filter may be a spatial matrix with trainable weights to be applied to the inputs. In contrast to the hidden state $h_t$ of the conventional neural networks, in the present configuration, the attention recurrent neural network provides a hidden state $H_t$ with a spatial structure. Furthermore, in the present configuration, the input $A_t \odot X_t$ maintains its original spatial layout, which is weighed according to the attention matrix. Furthermore, in EQUATION 7, the filter F performs a convolution, in contrast to an inner product performed in conventional neural networks.

That is, the convolutional attention recurrent neural network does not treat all input dimensions equally. Rather, as shown in EQUATION 7, the spatial dimensions are weighed according to an attention matrix that weights each spatial dimension differently. The attention component generates a feature map by weighing the spatial dimensions of an input to the convolutional attention recurrent neural network.

Figure 7C:
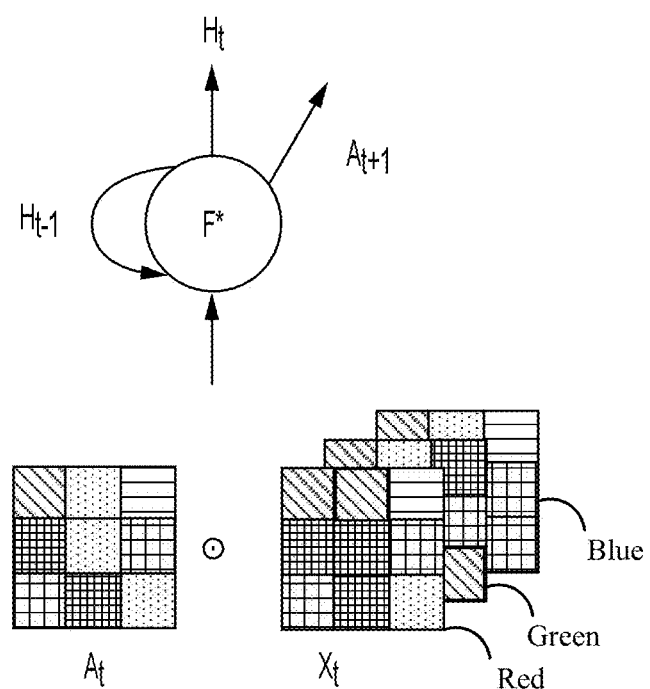
FIG. 7C illustrates an example of a convolutional attention recurrent neural network (RNN) according to an aspect of the present disclosure.

FIG. 7C illustrates an example of a convolutional attention recurrent neural network according to an aspect of the present disclosure. As shown in FIG. 7C, a three-dimensional feature map $X_t$ (represented by red, blue, and green feature maps (e.g., channels)) and a two-dimensional saliency map $A_t$ (e.g., attention map) are combined by element-wise multiplication along the spatial dimensions as input to the network that uses the convolutional filter F and a previous hidden state $H_{t-1}$ to compute the current hidden state $H_t$.

In one configuration, a class of interest for the frame $I_t$ is identified based on the multi-dimensional hidden state and training data. The class of interest may be an action, an object, and/or an event. For example, for frame 504 in FIG. 5A, the action may be jumping and/or diving, the object may be a diver, and the event may be diving. Furthermore, training data refers to previous examples that were used to train a neural network, such as the recurrent neural network and/or a convolutional neural network. Using the class of interest of each frame $(I_1-I_t)$ of the sequence of frames, an object and/or an action may be determined for the sequence of frames. For example, for frame 504 and other frames prior to and/or after frame 504 in a sequence of frames, the class of interest of each frame may be used to determine the class of interest for the sequence of frames. In this example, the class of interest for the sequence of frames may be diving and/or a diver.

The frame may be a two-dimensional (2D) slice of spatio-temporal data. Furthermore, the frame may be referred to as an image. In one configuration, for the convolutional attention recurrent neural network, the internal representation (e.g., the hidden state) of the input includes a spatial layout.

The attention map provides the recurrent neural network with the location of action in a frame using appearance motion information, such as optical flow. In one configuration, the optical flow may be described by a field of vectors that indicate a predicted movement of a pixel from one frame to the next frame. That is, the optical flow tracks action in the pixels and considers the motion to predict the features with the greatest saliency within the sequence of frames.

Both an attention recurrent neural network and a convolutional attention recurrent neural network use an attention map and a feature map as an input. The attention map is updated by the recurrent neural network, the feature map is updated, at each time step, when a new frame is received. In comparison to a conventional recurrent neural network, both the attention recurrent neural network and convolutional attention recurrent neural network treat the spatial dimensions of their input differently. In addition, convolutional attention recurrent neural networks improve the use of the spatial dimensions to generate attention maps. That is, the attention recurrent neural network uses a vectorized representation of the input without considering spatial correlations In contrast, the convolutional attention recurrent neural network uses a convolution that considers the spatial correlation of the input and retains the spatial structure over time.

According to an aspect of the present disclosure, the saliency map $A_t$ is a current two-dimensional attention map. The attention map may be based on an image (e.g., frame) of a sequence of frames (e.g., video). The attention map is generated by the convolutional attention recurrent neural network based on elements deemed important by the convolutional attention recurrent neural network. That is, the attention map provides the convolutional attention recurrent neural network of the location in a frame that an action takes place using appearance or motion information. As shown in FIGS. 5B and 7C, a new attention map $A_{t+1}$ may be generated based on a previous hidden state $H_t$ and a current input feature map $X_{t+1}$.

Furthermore, as shown in FIG. 7C, the feature map $X_t$ is a multi-dimensional input. As previously discussed, the multi-dimensional feature map $X_t$ may be produced via an upper convolution layer of a convolutional neural network (e.g., FC2 in FIG. 3B) or via a recurrent neural network, for example. The convolutional attention recurrent neural network may also include a spatial layout. The multi-dimensional feature map may be a 2D or 3D feature map, which may be appearance, optical flow, motion boundaries (e.g., gradient of optical flow), semantic segmentation at a feature level, and/or the like.

As an example, video processing may be specified to determine the content or action of a video. For example, the video processing may be used for action recognition in video, video indexing and/or categorizing. Preserving the spatial structure for images, such as frames of a video, is desirable for video processing. That is, the convolutional component retains the spatial layout and an attention component retains a movement layout. Thus, by using a convolutional attention recurrent neural network, correlation between video frames is preserved.

Figure 8:
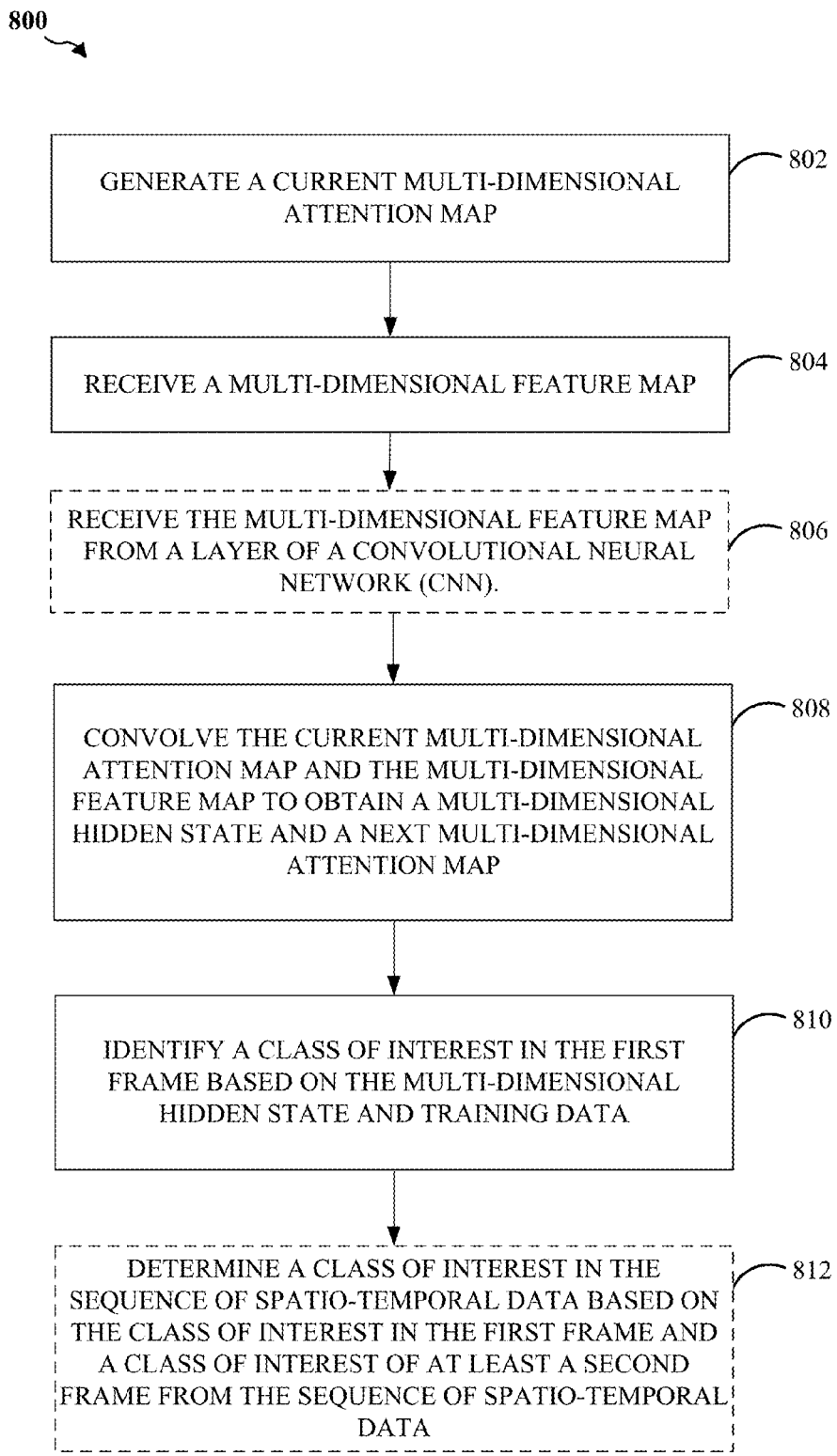
FIG. 8 illustrates a flow diagram for a method of processing within a convolutional attention recurrent neural network (RNN) according to aspects of the present disclosure.

FIG. 8 illustrates a method 800 for processing within a convolutional attention recurrent neural network. At block 802, the recurrent neural network generates a current multi-dimensional attention map. The attention map indicates areas of interest (e.g., important areas) in a frame from a sequence of spatio-temporal data. In one configuration, the spatio-temporal data is a video. The attention map may be a two-dimensional map. Furthermore, the attention map may be referred to as a saliency map. The attention map is generated by the convolutional attention recurrent neural network based on elements deemed important by the convolutional attention recurrent neural network.

In block 804, the recurrent neural network receives a multi-dimensional feature map. The multi-dimensional feature map may be a three-dimensional feature map or two-dimensional feature map. Additionally, the multi-dimensional feature map may be based on the first frame. Furthermore, in one configuration, after a first time step, the current multi-dimensional attention map is based on a prior multi-dimensional attention map and a second frame of the sequence of spatio-temporal data. In one configuration, the multi-dimensional feature map $X_t$ is produced via an upper convolution layer of a convolutional neural network (e.g., FC2 in FIG. 3B) or via a recurrent neural network.

Additionally, in one optional configuration, at block 806, the recurrent neural network receives the multi-dimensional feature map from a layer of a convolutional neural network (CNN).

Furthermore, in block 808, the recurrent neural network convolves the current multi-dimensional attention map and the multi-dimensional feature map to obtain a multi-dimensional hidden state and a next multi-dimensional attention map. That is, the current attention map and feature map may be combined by element-wise multiplication (e.g., At⊙Xt) resulting in a weighted feature map. The recurrent neural network may convolve the weighted feature map and previous hidden state to obtain the current hidden state, as shown in EQUATION 7. In one configuration, the convolving comprises applying a multi-dimensional filter. Furthermore, the convolving may be based on a prior multi-dimensional hidden state. The next hidden state and next input feature map may be used to generate the next attention map.

In one configuration, the recurrent neural network is a convolutional attention recurrent neural network. Furthermore, the recurrent neural network may be an attention long short-term memory (LSTM) network.

Additionally, in block 810, the recurrent neural network identifies a class of interest in the first frame based on the multi-dimensional hidden state and training data. As an example, video processing may be specified to determine the content or action of a video. For example, the video processing may be used for action recognition in video, video indexing and/or categorizing. In one configuration, the class of interest is an action, an object, and/or an event Further optionally, at block 812, the recurrent neural network determines a class of interest in the sequence of spatio-temporal data based on the class of interest in the first frame and a class of interest of at least a second frame from the sequence of spatio-temporal data.

In some aspects, method 800 may be performed by the SOC 100 (FIG. 1) or the system 200 (FIG. 2). That is, each of the elements of method 800 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of a list of" items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of processing data within a convolutional attention recurrent neural network (RNN), comprising:
   generating a current multi-dimensional attention map, the current multi-dimensional attention map indicating areas of interest in a first frame from a sequence of spatio-temporal data;
   receiving a multi-dimensional feature map;
   convolving the current multi-dimensional attention map and the multi-dimensional feature map to obtain a multi-dimensional hidden state and a next multi-dimensional attention map; and
   identifying a class of interest in the first frame based on the multi-dimensional hidden state and training data.

2. The method of claim 1, further comprising determining a class of interest in the sequence of spatio-temporal data based on the class of interest in the first frame and a class of interest of at least a second frame from the sequence of spatio-temporal data.

3. The method of claim 1, in which the class of interest is at least one of an action, an object, an event, or a combination thereof.

4. The method of claim 1, in which the convolving comprises applying a multi-dimensional filter.

5. The method of claim 4, in which the convolving is further based on a prior multi-dimensional hidden state.

6. The method of claim 1, in which the convolutional attention RNN comprises an attention long short-term memory (LSTM) network.

7. The method of claim 1, in which the multi-dimensional feature map is based on the first frame.

8. The method of claim 1, in which, after a first time step, the current multi-dimensional attention map is based on a prior multi-dimensional attention map and a second frame of the sequence of spatio-temporal data.

9. The method claim 1, further comprising receiving the multi-dimensional feature map from a layer of a convolutional neural network (CNN).

10. The method of claim 1, in which the spatio-temporal data is a video.

11. An apparatus for processing data within a convolutional attention recurrent neural network (RNN), comprising:
    a memory; and
    at least one processor coupled to the memory, the at least one processor configured:
      to generate a current multi-dimensional attention map, the current multi-dimensional attention map indicating areas of interest in a first frame from a sequence of spatio-temporal data;
      to receive a multi-dimensional feature map;
      to convolve the current multi-dimensional attention map and the multi-dimensional feature map to obtain a multi-dimensional hidden state and a next multi-dimensional attention map; and
      to identify a class of interest in the first frame based on the multi-dimensional hidden state and training data.

12. The apparatus of claim 11, in which the at least one processor is further configured to determine a class of interest in the sequence of spatio-temporal data based on the class of interest in the first frame and a class of interest of at least a second frame from the sequence of spatio-temporal data.

13. The apparatus of claim 11, in which the class of interest is at least one of an action, an object, an event, or a combination thereof.

14. The apparatus of claim 11, in which the at least one processor is further configured to apply a multi-dimensional filter to convolve the current multi-dimensional attention map and the multi-dimensional feature map.

15. The apparatus of claim 14, in which the at least one processor is further configured to convolve based on a prior multi-dimensional hidden state.

16. The apparatus of claim 11, in which the convolutional attention RNN comprises an attention long short-term memory (LSTM) network.

17. The apparatus of claim 11, in which the multi-dimensional feature map is based on the first frame.

18. The apparatus of claim 11, in which, after a first time step, the current multi-dimensional attention map is based on a prior multi-dimensional attention map and a second frame of the sequence of spatio-temporal data.

19. The apparatus claim 11, in which the at least one processor is further configured to receive the multi-dimensional feature map from a layer of a convolutional neural network (CNN).

20. The apparatus of claim 11, in which the spatio-temporal data is a video.

21. A non-transitory computer-readable medium having program code recorded thereon for processing data within a convolutional attention recurrent neural network (RNN), the program code being executed by a processor and comprising:
- program code to generate a current multi-dimensional attention map, the current multi-dimensional attention map indicating areas of interest in a first frame from a sequence of spatio-temporal data;
- program code to receive a multi-dimensional feature map;
- program code to convolve the current multi-dimensional attention map and the multi-dimensional feature map to obtain a multi-dimensional hidden state and a next multi-dimensional attention map; and
- program code to identify a class of interest in the first frame based on the multi-dimensional hidden state and training data.

22. The non-transitory computer-readable medium of claim 21, in which program code further comprises program code to determine a class of interest in the sequence of spatio-temporal data based on the class of interest in the first frame and a class of interest of at least a second frame from the sequence of spatio-temporal data.

23. The non-transitory computer-readable medium of claim 21, in which the class of interest is at least one of an action, an object, an event, or a combination thereof.

24. The non-transitory computer-readable medium of claim 21, in which the program code further comprises program code to apply a multi-dimensional filter to convolve the current multi-dimensional attention map and the multi-dimensional feature map.

25. The non-transitory computer-readable medium of claim 24, in which the program code to apply further comprises program code to convolve based on a prior multi-dimensional hidden state.

26. An apparatus for processing data within a convolutional attention recurrent neural network (RNN), comprising:
- means for generating a current multi-dimensional attention map, the current multi-dimensional attention map indicating areas of interest in a first frame from a sequence of spatio-temporal data;
- means for receiving a multi-dimensional feature map;
- means for convolving the current multi-dimensional attention map and the multi-dimensional feature map to obtain a multi-dimensional hidden state and a next multi-dimensional attention map; and
- means for identifying a class of interest in the first frame based on the multi-dimensional hidden state and training data.

27. The apparatus of claim 26, further comprising means for determining a class of interest in the sequence of spatio-temporal data based on the class of interest in the first frame and a class of interest of at least a second frame from the sequence of spatio-temporal data.

28. The apparatus of claim 26, in which the class of interest is at least one of an action, an object, an event, or a combination thereof.

29. The apparatus of claim 26, in which the means for convolving further comprises means for applying a multi-dimensional filter.

30. The apparatus of claim 29, in which the means for convolving is further based on a prior multi-dimensional hidden state.

* * * * *